United States Patent [19]

Will

[11] Patent Number: 5,853,476
[45] Date of Patent: Dec. 29, 1998

[54] PROCESS FOR COLORING CONCRETE USING COMPACTED INORGANIC GRANULES

[75] Inventor: James T. Will, Easton, Pa.

[73] Assignee: Elementis Pigments, Inc., Fairview Heights, Ill.

[21] Appl. No.: 909,156

[22] Filed: Aug. 11, 1997

[51] Int. Cl.$^6$ .......................... C04B 14/00; C04B 14/02; C04B 14/30; C04B 14/36

[52] U.S. Cl. .......................... 106/712; 106/725; 106/717; 106/733; 106/814; 106/436; 106/439; 106/440; 106/447; 106/441; 106/456; 106/459; 106/460; 106/472; 106/473; 106/446; 106/457; 106/453; 106/454; 106/475; 106/476; 106/480; 106/499; 106/501.1; 106/503

[58] Field of Search .......................... 106/712, 401, 106/436, 439, 440, 447, 441, 456, 459, 460, 473, 474, 476, 480, 499, 501.1, 503, 819, 725, 717, 733, 814, 472, 446, 457, 453, 454, 475

[56] References Cited

U.S. PATENT DOCUMENTS

| | | | |
|---|---|---|---|
| Re. 20,776 | 7/1938 | Amon | 106/24 |
| 1,972,207 | 9/1934 | Tucker | 106/24 |
| 1,972,208 | 9/1934 | Tucker | 106/24 |
| 2,141,569 | 12/1938 | Tucker et al. | 106/27 |
| 2,167,432 | 7/1939 | Cox et al. | 23/239 |
| 2,221,175 | 11/1940 | Bechtold | 106/27 |
| 2,491,832 | 12/1949 | Salvesen et al. | 260/124 |
| 2,690,398 | 9/1954 | Guertler et al. | 106/165 |
| 2,872,329 | 2/1959 | Scripture et al. | 106/92 |
| 3,068,109 | 12/1962 | Rodeffer | 106/98 |
| 3,117,882 | 1/1964 | Herschler et al. | 106/90 |
| 3,448,096 | 6/1969 | Kead | 260/124 |
| 3,615,809 | 10/1971 | Nagle et al. | 106/300 |
| 3,617,358 | 11/1971 | Dittrich | 117/105.2 |
| 3,720,528 | 3/1973 | Jordan | 106/90 |
| 3,764,362 | 10/1973 | Hinley et al. | 106/300 |
| 3,773,536 | 11/1973 | Batten et al. | 106/309 |
| 3,808,192 | 4/1974 | Dimitri | 260/124 |
| 3,836,378 | 9/1974 | Hahnkamm et al. | 106/288 |
| 3,843,380 | 10/1974 | Beyn | 106/300 |
| 3,969,457 | 7/1976 | Paris | 264/117 |
| 4,015,999 | 4/1977 | Robertson et al. | 106/308 |
| 4,055,439 | 10/1977 | Bäbler et al. | 106/288 |
| 4,127,421 | 11/1978 | Ferrill, Jr. | 106/298 |
| 4,134,725 | 1/1979 | Büchel et al. | 8/79 |
| 4,154,622 | 5/1979 | Momoi et al. | 106/308 |
| 4,177,082 | 12/1979 | Robertson | 106/309 |
| 4,188,231 | 2/1980 | Valore | 106/90 |
| 4,254,201 | 3/1981 | Sawai et al. | 430/111 |
| 4,255,375 | 3/1981 | Macpherson et al. | 264/117 |
| 4,261,966 | 4/1981 | Portes et al. | 423/633 |
| 4,264,552 | 4/1981 | McMahon et al. | 264/117 |
| 4,277,288 | 7/1981 | Lawrence et al. | 106/309 |
| 4,285,994 | 8/1981 | Pearce et al. | 427/222 |
| 4,308,073 | 12/1981 | Mills | 106/307 |
| 4,310,483 | 1/1982 | Dörfel et al. | 264/117 |
| 4,366,139 | 12/1982 | Kühner et al. | 423/449 |
| 4,450,106 | 5/1984 | Forss | 260/124 |
| 4,464,203 | 8/1984 | Belde et al. | 106/308 |
| 4,494,994 | 1/1985 | Cioca et al. | 106/308 |
| 4,704,230 | 11/1987 | Blackmore | 252/502 |
| 4,725,317 | 2/1988 | Wheeler | 106/290 |
| 4,909,851 | 3/1990 | Morris et al. | 106/400 |
| 4,946,505 | 8/1990 | Jungk | 106/712 |
| 4,952,617 | 8/1990 | Ayala et al. | 523/200 |
| 5,002,609 | 3/1991 | Rademachers et al. | 106/456 |
| 5,164,007 | 11/1992 | Buxbaum | 106/712 |
| 5,199,986 | 4/1993 | Krockert et al. | 106/712 |
| 5,215,583 | 6/1993 | Kröckert et al. | 106/712 |
| 5,215,584 | 6/1993 | Buxbaum et al. | 106/712 |
| 5,322,563 | 6/1994 | Van Bonn et al. | 106/712 |
| 5,484,481 | 1/1996 | Linde et al. | 106/712 |

FOREIGN PATENT DOCUMENTS 1537663   1/1979   United Kingdom .

OTHER PUBLICATIONS

Article entitled: *Sizing Up The Agglomeration Process.*

Primary Examiner—Michael Marcheschi
Attorney, Agent, or Firm—Eckert Seamans Cherin & Mellott, LLC

[57] ABSTRACT

A method for coloring cementitious systems using compacted inorganic granules, wherein said compacted inorganic granules comprise an inorganic pigment and a dispersing agent. Particularly, a method for coloring cementitious systems using compacted inorganic granules; wherein said compacted inorganic granules are produced by a process consisting of: (a) mixing an inorganic pigment and a dispersing agent, (b) compacting the mixture, (c) milling the compacted mixture, and (d) classifying the compacted mixture into at least one oversize material stream, at least one undersize material stream and at least one product stream of compacted inorganic granules; and wherein the coloring effect of the compacted inorganic granules in the cementitious system equals or exceeds the powder standard.

17 Claims, No Drawings

5,853,476

PROCESS FOR COLORING CONCRETE USING COMPACTED INORGANIC GRANULES

1. FIELD OF THE INVENTION

This invention relates to a method for coloring cementitious systems using compacted inorganic granules, wherein said compacted inorganic granules comprise an inorganic pigment and a dispersing agent. Particularly, the invention comprises a method for coloring cementitious systems using compacted inorganic granules; wherein said compacted inorganic granules are produced by a process consisting of: (a) mixing at least one inorganic pigment and at least one dispersing agent, (b) compacting the mixture, (c) milling the compacted mixture, and (d) classifying the milled compacted mixture into at least three streams, namely at least one oversize material stream, at least one undersize material stream and at least one product stream of compacted inorganic granules; and wherein the coloring effect of the compacted inorganic granules in the cementitious system equals or exceeds the powder standard.

2. BACKGROUND OF THE INVENTION

Inorganic pigments such as metal oxides, for example, iron oxides, are conventionally used as coloring components in the construction, paint, plastic and other industries. These inorganic pigments are incorporated for coloring into the desired application system such as cementitious systems usually through intensive mixing. Some key performance properties for the pigments are dispersibility of the pigment throughout the application system, the coloring effect associated with the pigment and the ease of handling.

The dispersibility is a measure of the ease with which the pigment particles can be uniformly and intimately mixed in the application system. Poor dispersion of the pigment particles can cause large agglomerates of pigment particles which may result in surface imperfections, color streaks, non uniform coloration or incomplete color development within the end product.

The color effect is a measure of the degree of coloration measured against a powder pigment standard. The powder pigment standard being defined as the color effect achieved in the application system using a crude inorganic pigment alone, wherein the crude inorganic pigment is the inorganic pigment incorporated into the compacted iron oxide pigments of the invention. For example, to determine the color effect of a product compacted pigment in a cementitious system, an equal quantity of crude inorganic pigment in powder form and product compacted iron oxide pigment would be dispersed into two separate but equal volumes of concrete. The color effect achieved using the crude inorganic pigment powder represents the benchmark standard to which the product compacted pigment/concrete system is compared.

The ease of handling takes into consideration difficulty associated with storing, transporting and mixing of the pigments in the application system. The mechanical stability of the pigments or granules is responsible for good storage, transporting and dosing of the granules into a cementitious system. Mechanical stability is brought about by high adhesive forces within the individual granules and depends on the compaction pressure used in forming the granules. It should be noted that the goals of achieving good dispersibility and good mechanical stability are counter to one another.

A problem with many inorganic pigments like metal oxides is that they normally do not disperse well in cementitious systems. Attempts have been made to provide a pigment particle with enhanced dispersion and coloring properties for many application systems. For instance, surface modifications of inorganic pigment particles by coating the particles with inorganic additives are known for improving coloring and processing properties in several application systems. For example see European Patent No. 87113450.8 (Burow et al.); U.S. Pat. No. 5,059,250 (Burow et al.); U.S. Pat. No. 4,053,325 (Vanderheiden); U.S. Pat. No. 4,753,679 (Damiano et al.); U.S. Pat. No. 4,952,617 (Ayala et al.); and U.S. Pat. No. 4,946,505 (Jungk).

Another approach is presented in U.S. Pat. No. 5,484,481 (Linde et al.). This reference discloses a process for the coloration of building materials, including concrete, using granulated inorganic pigments. The granulated inorganic pigments used are disclosed as being compacted granules produced using four separate devices in a particular sequence, namely a mixer, a compactor, a rough-grinder and a rotating pan. The reference specifically teaches that the individual devices alone or in other combinations do not lead to the granulated pigments according to that invention. Furthermore, the reference specifically teaches that there is no recycle of over- and undersize material. In other words, the reference teaches that essentially all of the material coming off the rotating pan is properly sized finished product.

Despite the many prior attempts at improving pigment particle performance in a variety of application systems, more effective means are constantly being sought. It would be desirable to provide compacted inorganic granules containing inorganic pigments for use in coloring cementitious systems, wherein the granules have a coloring effect at least equal to that of the powder standard.

3. SUMMARY OF THE INVENTION

We have now discovered a method for coloring cementitious systems, comprising: dispersing compacted inorganic granules in the cementitious system; wherein said compacted inorganic granules comprise an inorganic pigment and a dispersing agent; wherein said compacted inorganic granules are produced by a process consisting of: (a) mixing at least one inorganic pigment and at least one dispersing agent, (b) compacting the mixture, (c) milling the compacted mixture, and (d) classifying the milled compacted mixture into at least three streams, namely at least one oversize material stream, at least one undersize material stream and at least one product stream of compacted inorganic granules.

It is an object of the invention to provide a method for coloring cementitious systems, comprising: dispersing compacted inorganic granules in the cementitious system, wherein the coloring effect of the compacted inorganic granules in the cementitious system equals or exceeds the powder standard.

It is another object of the invention to provide a method for coloring cementitious systems, comprising: dispersing compacted inorganic granules in the cementitious system, wherein the compacted inorganic granules comprise a mixture of at least one inorganic pigment and at least one dispersing agent wherein the mixture is compacted using a force of between 500 to 1,700 psi (pounds/square inch).

It is another object of the invention to provide a method for coloring cementitious systems, comprising: dispersing compacted inorganic granules in the cementitious system, wherein the compacted inorganic granules contain iron oxide pigments.

It is another object of the invention to provide a method for coloring cementitious systems, comprising: dispersing compacted inorganic granules in the cementitious system, wherein the compacted inorganic granules contain lignin sulphonate.

It is another object of the invention to provide a method for coloring cementitious systems, comprising: dispersing compacted inorganic granules in the cementitious system, wherein the compacted inorganic granules are essentially water free.

It is another object of the invention to provide a method for coloring cementitious systems, comprising: dispersing compacted inorganic granules in the cementitious system, wherein the compacted inorganic granules consist essentially of at least one inorganic pigment selected from the group comprising all pigments as per ASTM C979-82, preferably iron oxides, chrome oxides, cobalt blues, mixed metal oxides, carbon blacks, titanium oxides and mixtures thereof; and at least one dispersing agent selected from the group comprising all chemicals known as plasticizers and superplasticizers as per Ramachandran, Concrete Admixtures Handbook (Noyes 1984), preferably stearates, acetates, alkylphenols, cellulosics, lignins, acrylics, epoxies, urethanes, sulfates, phosphates, formaldehyde condensates, silicates, silanes, siloxanes, titanates and mixtures thereof.

It is another object of the invention to provide a method for coloring a cementitious system, comprising: dispersing compacted inorganic granules in the cementitious system; wherein the compacted inorganic granules have a particle size between 30 to 80 mesh.

It is another object of the invention to provide a method for coloring concrete, comprising: (a) providing compacted inorganic granules, wherein said compacted inorganic granules are produced by a process consisting of: (a.1) mixing at least one inorganic pigment and at least one dispersing agent, (a.2) compacting the mixture, (a.3) milling the compacted mixture, and (a.4) classifying the milled compacted mixture into at least three streams, namely at least one oversize material stream, at least one undersize material stream and at least one product stream of compacted inorganic granules; (b) mixing said compacted inorganic granules with concrete at conditions sufficient to form a homogeneous dispersal of said compacted inorganic granules in the concrete; and, (c) allowing the mixture to set; wherein the coloring effect of the compacted inorganic granules in the concrete equals or exceeds the powder standard.

These and other objects of the invention are met by compacted inorganic granules, comprising: an inorganic pigment and a dispersing agent; wherein said compacted inorganic granules are produced by a process consisting of: (a) mixing at least one inorganic pigment and at least one dispersing agent, (b) compacting the mixture, (c) milling the compacted mixture, and (d) classifying the milled compacted mixture into at least three streams, namely at least one oversize material stream, at least one undersize material stream and at least one product stream of compacted inorganic granules.

The invention recognizes that the particle size of the compacted inorganic granules and the compressive force used to compact the granules affect the dispersibility and coloring affect of the granules in the cementitious system to which the granules are added.

These and other advantages of the invention will become more apparent in connection with the following description of certain embodiments of the invention as disclosed in non-limiting examples.

4. DETAILED DESCRIPTION OF THE PREFERRED EMBODIMENTS OF THE INVENTION

The following detailed description is of the best presently contemplated mode of carrying out the invention. The description is not intended in a limiting sense, and it is made solely for the purpose of illustrating the general principles of the invention. The various features and advantages of the present invention may be more readily understood with reference to the following detailed description.

The invention is briefly, a method for coloring a cementitious system, comprising: dispersing compacted inorganic granules in the cementitious system; wherein said compacted inorganic granules comprise at least one inorganic pigment and at least one dispersing agent; wherein said compacted inorganic granules are produced by a process consisting of: (a) mixing the at least one inorganic pigment and the at least one dispersing agent, (b) compacting the mixture, (c) milling the compacted mixture, and (d) classifying the milled compacted mixture into at least three streams, namely at least one oversize material stream, at least one undersize material stream and at least one product stream of compacted inorganic granules; and, wherein the coloring effect of the compacted inorganic granules in the cementitious system equals or exceeds the powder standard.

The compacted inorganic granules of the invention may be dispersed in a cementitious system using well known processing techniques.

The at least one inorganic pigment used to produce the compacted inorganic granules may be selected from the group comprising all pigments as per ASTM C979-82; preferably iron oxides, chrome oxides, cobalt blues, mixed metal oxides, carbon blacks, titanium oxides and mixtures thereof; most preferably iron oxide.

The at least one dispersing agent used to produce the compacted inorganic granules may be selected from the group comprising all chemicals known as plasticizers and superplasticizers as per Ramachandran, Concrete Admixtures Handbook (Noyes 1984); perferably stearates, acetates, alkylphenols, cellulosics, lignins, acrylics, epoxies, urethanes, sulfates, phosphates, formaldehyde condensates, silicates, silanes, siloxanes, titanates and mixtures thereof; most preferably lignin sulphonate.

The dispersing agent should be added in sufficient quantity to provide compacted inorganic granules comprising between 0.5 to 10 wt % dispersing agent; preferably between 2 to 5 wt % dispersing agent; most preferably when the dispersing agent is lignin sulphonate, about 3 wt % dispersing agent.

The at least one inorganic pigment and at least one dispersing agent are mixed using well known techniques. For example, the components may be mixed using a continuous turbulizer with volumetric feeders attached for each component. Alternatively, the components may be mixed in a thirty gallon ribbon blender for 20 to 30 minutes at about 50 revolutions per minute. The components could also be mixed in a 10–20,000 pound drum blender for 10 to 20 hours at 2 to 5 revolutions per minute. These examples are not intended in a limiting sense, and are provided solely for the purpose of illustration. Those skilled in the art will understand that other methods of mixing could be utilized.

The mixture of at least one inorganic pigment and at least one dispersing agent may be compacted using known compaction techniques. For example, the components may be compacted using a Hosokawa Bepex MS-60 compactor. The compaction force used to form the compacted inorganic granules should be in the range from 500 to 1,700 psi; preferably, the compaction force should be in the range from 500 to 700 psi. Preferably, the gap size between the rollers should be about 0.04" and the roller speed should be about 5.5 to 12.5 revolutions per minute. Most preferably, the compaction force used should be such that the coloring effect of the product compacted inorganic granules in a cementitious system exceeds the powder standard.

The material discharged from the milling step preferably has a particle size distribution between 12 to 400 mesh with a yield of about 40% having a particle size between 30 to 80 mesh. The compacted material discharged from the milling step is classified according to size using known techniques. For example, the compacted material may be classified using a screener (i.e., Kason Screener K48-2-CS) with a top 30 mesh screen and a bottom 80 mesh screen with both clearing rings and a sweep brush.

The classified material may be separated into at least three streams. Preferably, the classified material is separated into at least one undersize material stream containing those granules having a particle size below 80 mesh; at least one oversize material stream containing those granules having a particle size above 30 mesh; and at least one product stream containing those granules having a particle size between 30 to 80 mesh.

The undersize material in the at least one undersize material stream may preferably be recycled back to the process wherein the at least one inorganic pigment and at least one dispersing agent are mixed.

The oversize material in the at least one oversize material stream may preferably be regranulated and classified with any oversize material regranulated, any undersize material may be recycled back to the mixing step, and the remaining material may be combined with the at least one product stream.

The compacted inorganic granules used in the method of the invention should be essentially water free. Particularly, the compacted inorganic granules used preferably should contain less than 0.3 wt % water.

In one preferred embodiment, the invention resides in a method for coloring concrete, comprising: (a) providing compacted inorganic granules, wherein said compacted inorganic granules are produced by a process consisting of: (a.1) mixing an inorganic pigment and a dispersing agent, (a.2) compacting the mixture, (a.3) milling the compacted mixture, and (a.4) classifying the milled compacted mixture into at least three streams, namely at least one oversize material stream, at least one undersize material stream and at least one product stream of compacted inorganic granules; (b) mixing said compacted inorganic granules with concrete at conditions sufficient to form a homogeneous dispersal of said compacted inorganic granules in the concrete; and, (c) allowing the mixture to set; wherein the coloring effect of the compacted inorganic granules in the concrete equals or exceeds the powder standard.

In the following examples, compacted inorganic granules were produced according to the invention. Comparative testing was conducted to demonstrate the improved dispersion and coloring properties of the compacted inorganic granules compared with a powder standard.

In particular, testing of the coloring effect was carried out in cement according to the following method:
  (a) mix 1151 g sand (yellow play), 575 g course aggregate (¼" calcite), and 4.5 g pigment for one minute;
  (b) add 150 g cement (Keystone type I) to the mixture and mix for one minute;
  (c) add 105 g water (Easton City) to the mixture and mix for two minutes;
  (d) prepare two pucks from the final mixture;
  (e) allow the two pucks to cure for twenty-four hours in a humidity oven;
  (f) measure the color effect of the pigment by placing the pucks on a CS-5 Spectrophotometer in multipoint mode and taking three face color readings per puck.

The above procedure was used to prepare two sets of pucks. The first set of pucks contained crude inorganic pigment powder and the second set of pucks contained product compacted inorganic granules. The pucks produced using crude inorganic pigment powder were taken as the standard to which the pucks containing product compacted inorganic granules were compared.

The instant invention is now illustrated by way of examples, which are intended to be purely exemplary and not limiting.

EXAMPLE 1

Two K-tron volumetric feeders were set to feed a TCJS-8 Turbulizer. The feeders were pre-set to yield a mix of 97% red iron oxide (RB-4097) and 3% lignosulfonate (823 Lignosite). The turbulizer speed was set at 2500 revolutions per minute and the discharges were directed into a high force feed screw running at 70 revolutions per minute. The discharge from the screw was feed to a MS-60 roll compactor set up having a 0.04" gap, an 18 amp load, and a 900 psi compaction force. The throughput rate was 900 lb./hr. The compacted material discharged from the roll compactor was in the form of compacted sticks which were subsequently milled in a Disintegrator mill model #RD-8-P32 running at 1000 revolutions per minute with 22 hammers and a 0.085" screen. The output from the mill was feed to a Kason screener model #K48-2-CS with 30 mesh top screen and an 80 mesh bottom screen with an operational sweep brush. Of the product collected from the screener, 43.43% was product material having a particle size between 30 and 80 mesh.

The 30 to 80 mesh product compacted inorganic granules collected off the screener were mixed in a concrete system and its coloring effect was compared to that of a powder standard. Specifically, the product compacted inorganic granules were mixed in a concrete system using the following procedure:
  (a) mix 1151 g sand (yellow play), 575 g course aggregate (¼" calcite), and 4.5 g pigment for one minute;
  (b) add 150 g cement (Keystone type I) to the mixture and mix for one minute;
  (c) add 105 g water (Easton City) to the mixture and mix for two minutes;
  (d) prepare two pucks from the final mixture;
  (e) allow the two pucks to cure for twenty-four hours in a humidity oven;
  (f) measure the color effect of the pigment by placing the pucks on a CS-5 Spectrophotometer in multipoint mode and taking three face color readings per puck.

The above procedure was used to prepare two sets of pucks. The first set of pucks contained crude inorganic pigment powder and the second set of pucks contained product compacted inorganic granules. The pucks produced using crude inorganic pigment powder were taken as the standard to which the pucks containing product compacted inorganic granules were compared. A visual color observation of the two sets of pucks determined that the pucks produced using product compacted inorganic granules were redder and had a brighter hue than the pucks produced using crude inorganic pigment powder. The visual observation is confirmed by the spectrophotometric data.

EXAMPLE 2

A batch ribbon blender model #IM-16 was charged with 48.5 lbs. of yellow iron oxide (YO-2087) and 1.5 lbs. of lignosulfonate (823 Lignosite). The constituents were mixed for 30 minutes. The resultant mixture was fed into an MS-60 compactor set up with a stick roll surface having a 0.04" gap, a stick roll rate of 5.5 revolutions per minute, an 18 amp load, with a compaction force of 1,000 psi and with a vacuum system engaged. The output from the blender was fed into a high compression screw feeder set at 75 rpm and 5.5 amps at no load. The throughput through the screw feeder was 1,500 lbs./hr. The screw feeder discharged into an RD-8 granulator set at 750 rpm having 22 hammers and a 0.85" screen. The granulated material was feed to a Kason screener having a 30 mesh top and a 50 mesh screen bottom and both a sweep brush and clean rings operating. Of the product collected from the screener, 29.2% was product material having a particle size between 30 and 50 mesh.

The 30 to 50 mesh product compacted inorganic granules collected off the screener were mixed in concrete system and its coloring effect was compared to that of a powder standard. Specifically, the product compacted inorganic granules were mixed in a concrete system using the following procedure:

(a) mix 1151 g sand (yellow play), 575 g course aggregate (¼" calcite), and 4.5 g pigment for one minute;
(b) add 150 g cement (Keystone type I) to the mixture and mix for one minute;
(c) add 105 g water (Easton City) to the mixture and mix for two minutes;
(d) prepare two pucks from the final mixture;
(e) allow the two pucks to cure for twenty-four hours in a humidity oven;
(f) measure the color effect of the pigment by placing the pucks on a CS-5 Spectrophotometer in multipoint mode and taking three face color readings per puck.

The above procedure was used to prepare two sets of pucks. The first set of pucks contained crude inorganic pigment powder and the second set of pucks contained product compacted inorganic granules. The pucks produced using crude inorganic pigment powder were taken as the standard to which the pucks containing product compacted inorganic granules were compared. A visual color observation confirmed by spectrometric data of the two sets of pucks determined that the pucks produced using product compacted inorganic granules were yellower and brighter than the pucks produced using crude inorganic pigment powder.

The invention having been disclosed in connection with the foregoing embodiments, additional embodiments will now be apparent to persons skilled in the art. The invention is not intended to be limited to the embodiments specifically mentioned, and accordingly reference should be made to the appended claims rather than the foregoing discussion, to assess the spirit and scope of the invention in which exclusive rights are claimed.

What is claimed is:

1. A process for coloring a cementitious system, comprising: dispersing compacted inorganic granules of a product stream in the cementitious system;
    wherein said compacted inorganic granules comprise an inorganic pigment and a dispersing agent;
    wherein said compacted inorganic granules are produced by a process consisting of:
    (a) mixing an inorganic pigment and a dispersing agent,
    (b) compacting the mixture,
    (c) milling the compacted mixture, and
    (d) classifying the milled compacted mixture into at least three streams, including at least one oversize material stream, at least one undersize material stream and at least one product stream of compacted inorganic granules; and,
    wherein a coloring effect of the compacted inorganic granules in the cementitious system equals or exceeds a powder standard.

2. The process of claim 1, wherein the mixture of inorganic pigment and dispersing agent is compacted using a force of 500 to 1,700 pounds per square inch.

3. The process of claim 1, wherein the mixture of inorganic pigment and dispersing agent is compacted using a compaction force that results in compacted inorganic granules which when mixed into the cementitious system impart thereto a brighter hue than that imparted by mixing an equal mass of the inorganic pigment into the cementitious system.

4. The process of claim 1, wherein the inorganic pigment is selected from the group consisting of iron oxides, chrome oxides, cobalt blues, mixed metal oxides, carbon blacks, titanium oxides and mixtures thereof.

5. The process of claim 1, wherein a sufficient quantity of dispersing agent is used to provide compacted inorganic granules comprising between 0.5 to 10 wt % dispersing agent.

6. The process of claim 1, wherein the dispersing agent is selected from the group consisting of stearates, acetates, alkylphenols, cellulosics, lignins, acrylics, epoxies, urethanes, sulfates, phosphates, formaldehyde condensates, silicates, silanes, siloxanes, titanates and mixtures thereof.

7. The process of claim 1, wherein the dispersing agent is lignin sulphonate.

8. The process of claim 7, wherein a sufficient quantity of dispersing agent is used to provide compacted inorganic granules comprising between 0.5 to 10 wt % lignin sulphonate.

9. The process of claim 1, wherein the compacted inorganic granules are essentially water free.

10. The process of claim 1, wherein the compacted inorganic granules contain less than 0.3 wt % water.

11. The process of claim 1, wherein the compacted inorganic granules consist essentially of
    at least one inorganic pigment selected from the group consisting of iron oxides, chrome oxides, cobalt blues, mixed metal oxides, carbon blacks, titanium oxides and mixtures thereof; and,
    at least one dispersing agent selected from the group consisting of stearates, acetates, alkylphenols, cellulosics, lignins, acrylics, epoxies, urethanes, sulfates, phosphates, formaldehyde condensates, silicates, silanes, siloxanes, titanates and mixtures thereof.

12. The process of claim 1, wherein the compacted inorganic granules in the at least one product stream are sized between 30 to 80 mesh.

13. The process of claim 1, wherein the compacted inorganic granules in the at least one product stream are sized between 30 to 50 mesh.

14. A process for coloring a cementitious system, comprising: dispersing compacted inorganic granules of a product stream in the cementitious system;
    wherein said compacted inorganic granules comprise an inorganic pigment and a dispersing agent;
    wherein said compacted inorganic granules are produced by a process consisting of:
    (a) mixing an inorganic pigment and a dispersing agent,
    (b) compacting the mixture,
    (c) milling the compacted mixture, and
    (d) classifying the milled compacted mixture into at least three streams, including at least one oversize material stream, at least one undersize material stream and at least one product stream of compacted inorganic granules; and, wherein a coloring effect of the compacted inorganic granules in the cementitious system equals or exceeds a powder standard; wherein the compacted inorganic granules in the at least one undersize material stream are recycled back to (a) where they are mixed with inorganic pigment and dispersing agent and compacted; wherein the compacted inorganic granules in the at least one oversize material stream are remilled; and wherein the remilled material is mixed with the compacted inorganic granules in the at least one product stream.

15. The process of claim 14, wherein the remilled material has a particle size between 30 to 80 mesh.

16. The process of claim 14, wherein the remilled material has a particle size between 30 to 50 mesh.

17. A method of coloring concrete, comprising:

(a) providing compacted inorganic granules, wherein said compacted inorganic granules are produced by a process consisting of:

(a.1) mixing an inorganic pigment and a dispersing agent, (a.2) compacting the mixture, (a.3) milling the compacted mixture, and (a.4) classifying the milled compacted mixture into at least three streams, including at least one oversize material stream, at least one undersize material stream and at least one product stream of compacted inorganic granules;

(b) mixing said compacted inorganic granules of the product stream with concrete at conditions sufficient to form a homogeneous dispersal of said compacted inorganic granules in the concrete; and, (c) allowing the mixture to set;

wherein a coloring effect of the compacted inorganic granules in the concrete equals or exceeds a powder standard.

* * * * *